(12) United States Patent
Herring et al.

(10) Patent No.: US 9,786,000 B2
(45) Date of Patent: Oct. 10, 2017

(54) METHOD, COMPUTER PROGRAM PRODUCT, AND SYSTEM FOR PROVIDING A SENSOR-BASED ENVIRONMENT

(71) Applicant: Toshiba Global Commerce Solutions Holdings Corporation, Tokyo (JP)

(72) Inventors: Dean Frederick Herring, Youngsville, NC (US); Adrian Xavier Rodriguez, Durham, NC (US); Ankit Singh, Morrisville, NC (US)

(73) Assignee: Toshiba Global Commerce Solutions, Tokyo (JP)

( * ) Notice: Subject to any disclaimer, the term of this patent is extended or adjusted under 35 U.S.C. 154(b) by 0 days.

(21) Appl. No.: 14/674,845

(22) Filed: Mar. 31, 2015

(65) Prior Publication Data

US 2016/0110622 A1 Apr. 21, 2016

Related U.S. Application Data

(60) Provisional application No. 62/064,323, filed on Oct. 15, 2014.

(51) Int. Cl.
*G06K 9/00* (2006.01)
*G06Q 30/00* (2012.01)
(Continued)

(52) U.S. Cl.
CPC ......... *G06Q 30/0633* (2013.01); *G01B 11/00* (2013.01); *G01G 19/4144* (2013.01); *G01S 19/13* (2013.01); *G06F 1/163* (2013.01); *G06F 3/012* (2013.01); *G06F 3/013* (2013.01); *G06K 9/00221* (2013.01); *G06K 9/00255* (2013.01); *G06K 9/00288* (2013.01); *G06K 9/00362* (2013.01); *G06K 9/00536* (2013.01); *G06K 9/00577* (2013.01); *G06K 9/00624* (2013.01); *G06K 9/209* (2013.01); *G06K 9/46* (2013.01); *G06K 9/6201* (2013.01); *G06K 9/6267* (2013.01); *G06K 9/78* (2013.01); *G06Q 20/18* (2013.01); *G06Q 20/204* (2013.01);
(Continued)

(58) Field of Classification Search
CPC .... G06Q 30/02; G06Q 20/40; G06Q 30/0601; G06Q 30/0255; G06Q 30/0269; H04N 13/0468
See application file for complete search history.

(56) References Cited

U.S. PATENT DOCUMENTS 5,497,314 A 3/1996 Novak
6,592,033 B2 7/2003 Jennings et al.
(Continued)

FOREIGN PATENT DOCUMENTS

WO 2013/134865 9/2013

*Primary Examiner* — Amara Abdi
(74) *Attorney, Agent, or Firm* — Patterson + Sheridan, LLP

(57) ABSTRACT

Method, computer program product, and system of visual identification of an item selected by a person during a transaction within an environment having a plurality of items. The method includes acquiring, using a visual sensor disposed within the environment, image information that includes at least a portion of the selected item, and analyzing the image information to determine a set of possible items for classifying the selected item. The method further includes selecting, based on personal profile information associated with the person, one of the set of possible items to thereby identify the selected item.

20 Claims, 11 Drawing Sheets

(51) Int. Cl.
| | |
|---|---|
| *G06Q 30/06* | (2012.01) |
| *G01G 19/414* | (2006.01) |
| *G06Q 20/18* | (2012.01) |
| *G06K 9/20* | (2006.01) |
| *G01S 19/13* | (2010.01) |
| *G06Q 20/20* | (2012.01) |
| *G06Q 20/32* | (2012.01) |
| *H04N 5/225* | (2006.01) |
| *H04N 7/18* | (2006.01) |
| *G06Q 30/02* | (2012.01) |
| *G06K 9/62* | (2006.01) |
| *G06K 9/78* | (2006.01) |
| *G06F 1/16* | (2006.01) |
| *G06F 3/01* | (2006.01) |
| *G06K 9/46* | (2006.01) |
| *G06T 11/60* | (2006.01) |
| *H04N 5/232* | (2006.01) |
| *G07G 1/00* | (2006.01) |
| *G01B 11/00* | (2006.01) |
| *G06T 7/66* | (2017.01) |
| *G01G 19/40* | (2006.01) |

(52) U.S. Cl.
CPC ......... *G06Q 20/209* (2013.01); *G06Q 20/322* (2013.01); *G06Q 30/016* (2013.01); *G06Q 30/0224* (2013.01); *G06Q 30/0235* (2013.01); *G06Q 30/0251* (2013.01); *G06Q 30/0269* (2013.01); *G06Q 30/0609* (2013.01); *G06Q 30/0623* (2013.01); *G06Q 30/0629* (2013.01); *G06Q 30/0631* (2013.01); *G06Q 30/0635* (2013.01); *G06Q 30/0639* (2013.01); *G06T 7/66* (2017.01); *G06T 11/60* (2013.01); *G07G 1/0045* (2013.01); *G07G 1/0063* (2013.01); *G07G 1/0072* (2013.01); *H04N 5/225* (2013.01); *H04N 5/232* (2013.01); *H04N 7/181* (2013.01); *G01G 19/40* (2013.01); *G06K 2009/00328* (2013.01); *G06K 2209/17* (2013.01); *G06T 2207/30232* (2013.01)

(56) References Cited

U.S. PATENT DOCUMENTS

| | | | |
|---|---|---|---|
| 7,653,574 B2 * | 1/2010 | Harper | G06Q 20/12 705/27.1 |
| 7,949,568 B2 | 5/2011 | Fano et al. | |
| 8,448,858 B1 * | 5/2013 | Kundu | G07F 17/3241 235/375 |
| 8,571,298 B2 | 10/2013 | McQueen et al. | |
| 2002/0016740 A1 * | 2/2002 | Ogasawara | G06Q 30/02 705/26.1 |
| 2003/0163399 A1 * | 8/2003 | Harper | G06F 17/30893 705/35 |
| 2008/0294514 A1 * | 11/2008 | Calman | G06Q 20/042 705/14.66 |
| 2009/0232368 A1 * | 9/2009 | Niinuma | G06K 9/00107 382/124 |
| 2010/0063862 A1 * | 3/2010 | Thompson | G06Q 30/02 705/7.29 |
| 2010/0076855 A1 * | 3/2010 | Karnin | A47F 9/047 705/24 |
| 2010/0086192 A1 * | 4/2010 | Grigsby | G06F 17/30256 382/141 |
| 2012/0054011 A1 * | 3/2012 | Petersen | G06Q 30/0214 705/14.16 |
| 2012/0233003 A1 | 9/2012 | Calman et al. | |
| 2012/0239504 A1 * | 9/2012 | Curlander | G06Q 30/02 705/14.66 |
| 2013/0030915 A1 * | 1/2013 | Statler | G06Q 30/06 705/14.54 |
| 2013/0048722 A1 | 2/2013 | Davis et al. | |
| 2013/0144759 A1 | 6/2013 | Toyomura et al. | |
| 2013/0223673 A1 | 8/2013 | Davis et al. | |
| 2014/0214623 A1 * | 7/2014 | Cancro | G06Q 30/0623 705/26.63 |
| 2014/0279191 A1 * | 9/2014 | Agarwal | G06Q 30/0633 705/26.7 |
| 2014/0365334 A1 * | 12/2014 | Hurewitz | G06Q 30/0613 705/26.41 |
| 2015/0012396 A1 * | 1/2015 | Puerini | G06Q 10/0875 705/28 |
| 2015/0019391 A1 | 1/2015 | Kumar et al. | |
| 2015/0100433 A1 * | 4/2015 | Choy | G06Q 30/0635 705/14.69 |
| 2015/0134413 A1 * | 5/2015 | Deshpande | G06Q 30/0205 705/7.31 |
| 2015/0235110 A1 * | 8/2015 | Curtis | G06K 9/00677 382/224 |

* cited by examiner

METHOD, COMPUTER PROGRAM PRODUCT, AND SYSTEM FOR PROVIDING A SENSOR-BASED ENVIRONMENT

CROSS-REFERENCE TO RELATED APPLICATIONS

This application claims benefit of U.S. provisional patent application Ser. No. 62/064,323, filed Oct. 15, 2014, entitled "Integrated Shopping Environment," which is herein incorporated by reference.

BACKGROUND

The present disclosure relates to a sensor-based environment, and more specifically, to techniques for identification of items selected by a person in the environment using visual identification and using personal profile information associated with the person.

Figure 1:
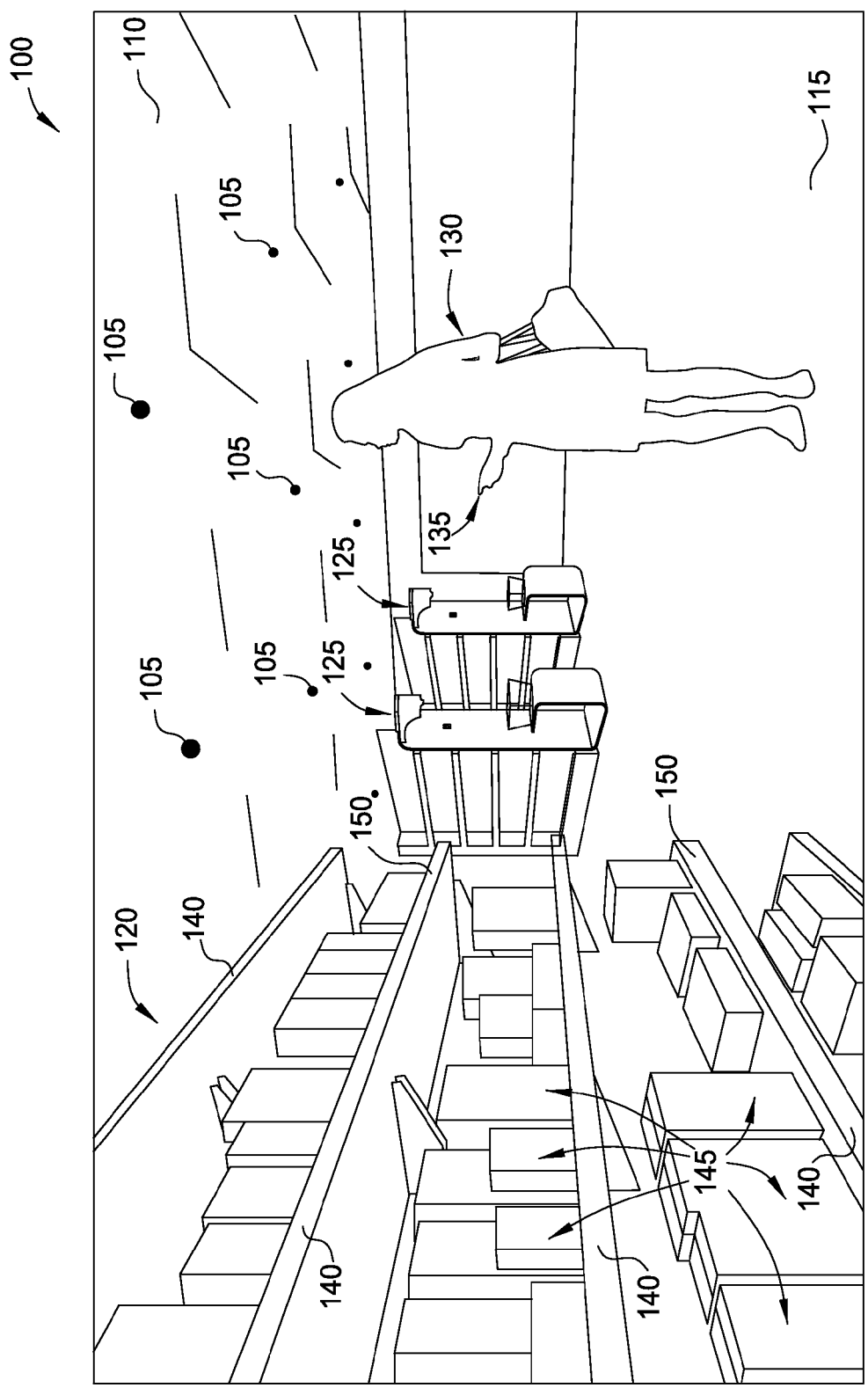
FIG. 1 illustrates an exemplary environment including a plurality of items, according to one embodiment.

To facilitate understanding, identical reference numerals have been used, where possible, to designate identical elements that are common to the figures. It is contemplated that elements disclosed in one embodiment may be beneficially utilized on other embodiments without specific recitation. The illustrations referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Aspects of the current disclosure relate to an integrated environment capable of providing a personalized, automated, and adaptive experience for a person within the environment. A number of different sensor devices may be employed within the environment, and networked with various computing devices such as point-of-sale (POS) terminals, digital signage, servers, and mobile or handheld computing devices to provide a seamless integration of mobile technologies and e-commerce into traditional experiences.

Using a system having one or more visual sensors within the environment, a retailer or other provider may compile and process environmental data related to a person's transaction within the environment. The environmental data may be used to identify various items selected by the person, which may include presentation of the items during a checkout transaction. The identification of the items may be based on an analysis of static imagery—such as an image of contents of the person's shopping cart at a particular time—and/or dynamic imagery (e.g., using a continuous video feed). Identification may occur at different times and places during the transaction within the environment, such as while the person browses items, while scanning items during a checkout transaction, and so forth.

In many cases, significant image processing is required to identify items included within the acquired image information. The image processing becomes more complex where a particular item is not entirely depicted within the image information, such as when the item is visually obscured by a person's hand, by other items, by portions of a shopping receptacle, etc. In these cases, a system may not be able to affirmatively identify (i.e., to a necessary degree of confidence) the item's identity using visual analysis, instead providing scores or some other relative measures of confidence. For example, an analysis might determine a 40% likelihood that a particular (obscured) item is of a first type, a 40% likelihood that the item is of a second type, and a 20% likelihood that the item is of a third type. In this example, the system may be unable to affirmatively identify the item, as it is equally likely that the item is of the first type or of the second type, and perhaps also because the 40% likelihood value may be insufficient to make such an identity determination (say, a 50% threshold value must be met).

However, the environmental data collected within the environment and associated with the person may be used in other ways to augment the visual identification of items. In some embodiments, image information acquired during previous transactions of the person may be processed to determine specific item interactions (such as which items are viewed, handled, purchased, etc.) and/or deduced preferences of the person related to certain items. The item interactions and preferences may be stored in a personal profile associated with the person. The personal profile may include any number of other types of information that are useful for conducting transactions in the environment, such as explicitly-indicated preferences, personal medical information, shopping lists, nutrition goals, and so forth.

The personal profile information may be applied beneficially in situations where the image analysis is deficient to affirmatively identify certain items. However, the personal profile information may also be beneficial when used more or less continuously to perform item identification, providing a more robust item identification and/or decreasing the amount of image analysis required to make affirmative identifications. In some cases, the person's item history, preferences, etc. from the personal profile may suggest a greater likelihood that a certain type of item was selected and corresponds to an item included in the acquired image information. In some cases, the personal profile information may suggest a small likelihood that a certain type of item was selected. If the likelihood of a particular possible item (matching the unknown item included in the image information) is sufficiently small, the possible item may be eliminated from consideration, reducing the scope of the image analysis to a smaller set of possible items.

By improving item identification, the retailer or other environment administrator may streamline operations throughout the environment. For example, improved item identification may be used to speed checkout transactions by requiring fewer audits of checkout transactions. While generally discussed within the context of a shopping environment, such as a retail store or commercial environment, it is contemplated that the techniques disclosed herein may be applied to other environments (some non-limiting examples include libraries, museums, classrooms, hospitals, etc.) to provide a similar experience for persons included therein.

FIG. 1 illustrates an exemplary environment including a plurality of items, according to one embodiment. The environment 100 includes a plurality of sensor modules 105 disposed in the ceiling 110 of the environment. The sensor modules 105 may each include one or more types of sensors, such as video sensors (e.g., cameras), audio sensors (e.g., microphones), and so forth. Sensor modules 105 may also include actuating devices for providing a desired position and/or orientation of the included sensor(s). Generally, the sensor modules or individual sensors may be disposed at any suitable location within the environment 100. Some non-limiting examples of alternative locations include below, within, or above a floor 115 of the environment, within other structural components of the environment 100 such as a shelving unit 120 or walls, and so forth. In some embodiments, sensors may be disposed on, within, or near item display areas such as the shelving unit 120. The sensors may be oriented toward expected locations of personal interactions with items in order to acquire better data about the person's interactions, such as determining the person's field of view relative to certain items, updating a virtual cart or transaction record for the person's transaction in the environment, and so forth.

Environment 100 also includes a number of computer-based terminals (or kiosks) 125. Generally, terminals 125 may be configured for performing customer checkout and/or other functions, such as providing information to a customer or employee. Each terminal 125 may each include a discrete computing device or portions of a computing system, and may include various I/O devices, such as visual displays, audio speakers, cameras, microphones, etc. for interacting with various persons such as customers and/or employees. In some embodiments, a person 130 in the environment may have a mobile computing device, such as a smartphone 135, that communicatively couples with the terminal 125 for completing a checkout transaction. For example, the person's smartphone 135 may include payment information, identification information, etc. that facilitate completion of the checkout transaction. In one embodiment, the mobile computing device may execute a store application that connects with the computing system of the environment (e.g., to store servers or other computing devices through the Internet). In one embodiment, the mobile computing device may be directly connected with kiosk 125 through wireless networks established within the environment (e.g., over Wi-Fi or Bluetooth). In one embodiment, the mobile computing device may couple with the kiosk 125 when brought within range, e.g., using Bluetooth or near-field communication (NFC).

Environment 100 also includes one or more shelving units 120 having shelves 140 that support various store items 145. Though not shown, multiple shelving units 120 may be disposed in a particular arrangement in the environment 100, with the space between adjacent shelving units forming aisles through which customers and employees may travel. For example, customers may navigate the aisles and/or approach the shelving units 120 to view items 145 included therein, to handle the items, to select the items, etc. In another example, employees may navigate the aisles and/or approach the shelving units 120 to view stock levels of the items 145, to determine out-of-place items, etc. In some embodiments, shelving units 120 may include visual sensors or other sensor devices or I/O devices. The sensors or devices may couple with the person's smartphone 135 and/or other networked computing devices (including terminals 125 and/or servers) that are associated with the environment 100. For example, the front portions 150 of shelves 140 may include video sensors oriented outward from the shelving unit 120 (i.e., toward the aisle) to acquire image information for a person's interactions with items 145 on the shelving unit 120, with the image information provided to back-end servers for storage and/or analysis. In some cases, some or all of the image information may also be accessible by a person's mobile computing device. In some embodiments, portions of the shelving unit 120 (such as the front portions 150 of shelves 140) may include indicator lights or other visual display devices or audio output devices that are able to communicate with a person.

During an exemplary transaction in the environment, the person 130 may have a shopping receptacle in which the person places items after they are selected for purchase. Examples of shopping receptacles include shopping carts, baskets, or other containers that may be carried or otherwise transported by the person during the transaction. Upon completion of the transaction—for example, the person has selected all of the desired items—the person may approach one of the terminals 125 or a designated checkout area to perform a checkout transaction.

In some cases, the checkout transaction may have "touchless" aspects or may be entirely touchless. For example, visual sensors included in the environment and/or within the approached terminal 125 may acquire image information that is usable to identify the person, items included within the shopping receptacle, etc. and that streamlines or otherwise facilitates the checkout transaction. As will be discussed further herein, logic may be applied to enhance the analysis of the image information using personal profile information associated with the person conducting the transaction. Application of the personal profile information may result in item identification processes having greater accuracy and/or confidence levels, as well as being performed more quickly. The improved accuracy and speed may help the person to spend a shorter time completing their checkout transaction, which can improve their overall transaction experience. Reducing time for checkout transactions also increases the collective throughput at the checkout area. In some cases, a person may be able to complete a checkout transaction simply as part of departing the environment, without requiring the person to stop at a checkout terminal or in the checkout area. In some cases, the person's time in the checkout area may be significantly reduced, such as only a momentary pause at a checkout terminal.

Figure 2:
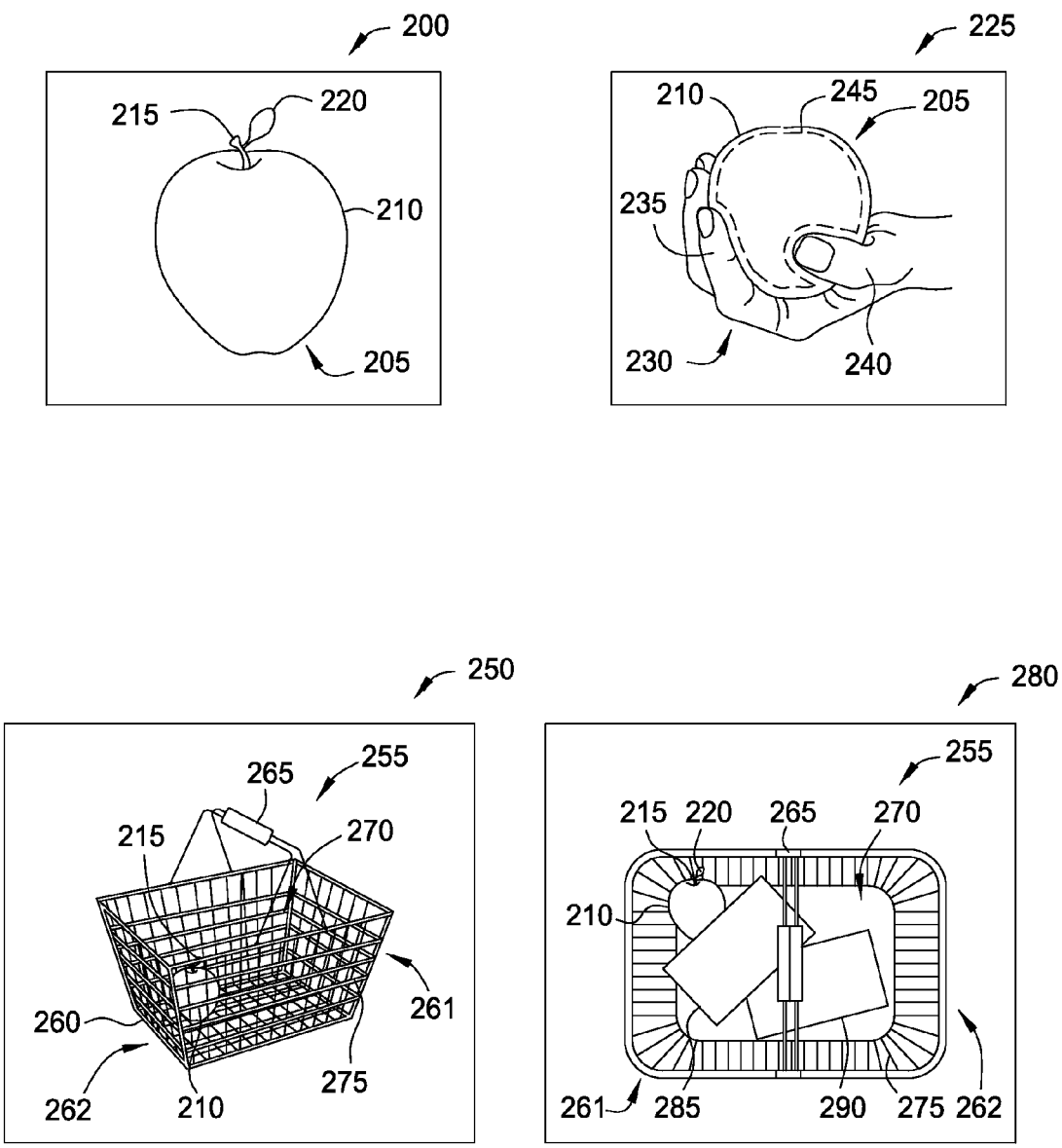
FIG. 2 illustrates exemplary image information including at least a portion of a selected item, according to one embodiment.

FIG. 2 illustrates exemplary image information including at least a portion of a selected item, according to one embodiment. Generally, the image information 200, 225, 250, 280 depicted in FIG. 2 represents different examples of "typical" image information acquired by a visual sensor within an environment, such as the sensor modules 105 of the environment 100. Of course, the person of ordinary skill will understand that the image information image information 200, 225, 250, 280 are simplified examples, and that acquired image information will depend on the relative disposition (e.g., location and orientation) of visual sensors and may include any number of different items.

Image information 200 depicts a side view of an apple 205 that includes body 210, stem 215, and leaf 220 portions. The apple 205 represents one item that is available within the environment, and which a person may select during a transaction. In some cases, the image information 200 may be captured using visual sensors disposed in the environment. In other cases, the image information 200 may represent reference image information, which may be compiled and accessed through a database. In some cases, reference image information is intentionally simplified, which includes acquiring the image information under controlled conditions, such as with predetermined perspective(s) and scale(s), a solid background color, etc. In one embodiment, the reference image information for a particular item includes only one of the item (e.g., a single apple), and may include several images of the item with different perspectives and scales. The reference image information may be compared with acquired image information from the environment as part of item identification.

Image information 225 depicts the apple 205 as held in a person's hand 230. The image information 225 may correspond to different phases of the person's transaction, such as handling the item, placing the item into a shopping receptacle, scanning the item at checkout, transferring the item into a bag, etc. The image information 225 includes a view of the apple 205 that is partially visually obscured by the hand 230. For example, the thumb 240 of hand 230 obscures a bottom portion of apple 205, while a forefinger 235 obscures part of the side portion of the apple, including the stem 215 and leaf 220. Accordingly, the portion of the item that is included in the image information 225 is shown as visible portion 245.

Obscuring portions of items naturally makes the visual identification process more challenging. For example, the full size and contour of the apple 205 is not readily apparent based solely on the visible portion 245. Certain physical attributes of the item may be determined by performing image analysis using the visible portion 245, which may be compared with reference image information to determine relative likelihoods that the visible portion 245 corresponds to a first type of item, a second type of item, etc.

Image information 250 depicts the apple 205 included within a shopping receptacle (here, a shopping basket 255). The shopping basket 255 includes a frame 260 having sides 261, 262 and forming an opening 270 through which items may be inserted and removed. Each of the sides 261, 262 may form a web-like assembly 275 for containing items within the shopping basket 255. The web-like assembly 275 allows at least a partial visibility through the sides 261, 262 of the shopping basket 255. Alternative implementations include clear sides, thin metal grids, etc. While portions of the apple 210 are obscured by the assembly, at least some portions remain visible. Thus, the visual sensors may capture image information including items in the shopping receptacle, even when oriented at shallow angles to the shopping receptacles (and not acquiring the image information through the opening 270).

Image information 280 depicts a top view of the shopping basket 255, which includes the apple 210 as well as two other items 285, 290. The image information 280 may represent image information captured by an overhead visual sensor within the environment (e.g., a visual sensor within a sensor module 105), or perhaps an overhead visual sensor integrated into a checkout station. Item 285 is positioned above and partially obscures both the item 290 and the apple 210.

In each of the image information 200, 225, 250, and 280, the image analysis may be benefitted by the application of information related to the person and his or her previous transactions within the environment. In some cases, this information may make it more likely that the item depicted in the image information is of a particular type (or not of a particular type), which can improve the speed and accuracy of item identification and may reduce the amount of image analysis required to otherwise identify the item.

Figure 3:
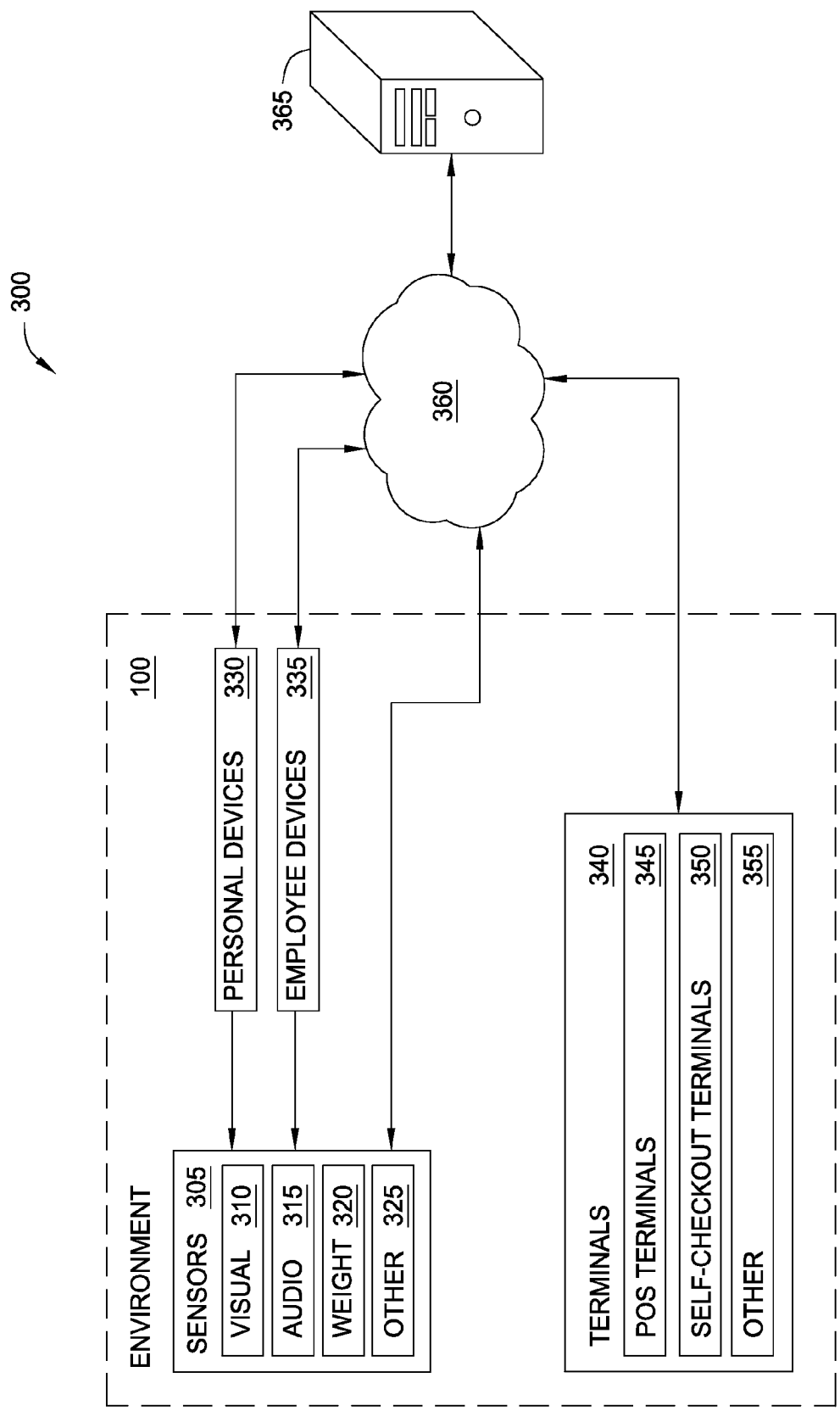
FIG. 3 illustrates an exemplary system of visual identification of a selected item based on personal profile information, according to one embodiment.

FIG. 3 illustrates an exemplary system of visual identification of a selected item based on personal profile information, according to one embodiment. The system 300 includes a number of components that are disposed within the environment 100. The system may also include components that are outside the environment—for example, a server 365 may be located remotely or proximately disposed to the environment (such as within a back room in the same building that is not accessible by customers).

Components within the environment include one or more sensors 305 of various types, such as visual sensors 310, audio sensors 315, and weight sensors 320. The sensors 305 may also include other sensors 325 capable of providing meaningful information about personal interactions within the environment, e.g., location sensors. The sensors 305 may be discrete sensor devices deployed throughout the environment 100 in fixed and/or movable locations. Sensors 305 may be statically included in walls, floors, ceilings, displays, or other non-sensor devices, or may be included in shopping receptacles capable of being transported through the environment. For example, weight sensors 320 may be disposed in fixed locations within the environment, such as within the floor or within a surface of a checkout terminal, and may also include load cells or other sensors disposed in a basket portion of a shopping receptacle. In one embodiment, sensors 305 may include adjustable-position sensor devices, such as motorized cameras (i.e., an example of visual sensors 310) attached to a rail, wire, or frame. In one embodiment, sensors 305 may be included on one or more unmanned vehicles configured to travel through some or all of the environment 100, such as unmanned ground vehicles (UGVs) or unmanned aerial vehicles (UAVs or "drones"). Sensors 305 may also include sensor devices that are included in computing devices associated with the environment 100, such as personal devices 330, employee devices 335, and terminals 340. In some cases, the computing devices (or the component sensor devices) may be implemented as body-worn or carried devices.

Personal devices 330 and employee devices 335 may each include passive or actively-powered devices capable of communicating with at least one of the networked devices of system 300. One example of a passive device (which may be worn or carried) is a NFC tag. Active devices may include mobile computing devices, such as smartphones or tablets, or wearable devices such as a Google Glass™ interactive eyepiece (Glass is a trademark of Google Inc.). The personal devices 330 generally denotes ownership or possession of the devices by customers within the environment 100, while the employee devices 335 denotes ownership or possession by the retailer or other administrator of the environment 100. In some cases, employee devices 335 may be carried by employees and used in the course of their employment. Personal devices 330 and employee devices 335 may execute applications or other program code that generally enables various functions and features accessible using server 365 and/or other networked computing devices. In some embodiments, sensor devices that are included with the personal devices 330 or employee devices 335 may be included in the sensors 305.

System 300 includes a plurality of terminals 340 within the environment 100. Terminals 340 generally include any structure that is capable of receiving input from and/or producing output to people (e.g., customers, employees) within the environment 100. The terminals 340 may include computing systems, portions of computing systems, or devices controllable by computing systems. In one example, a terminal 340 may include a computing device that is communicatively coupled with a visual display and audio speaker(s), as well as being communicatively coupled with one or more input devices. In another example, a terminal 340 may include a visual display and associated driver hardware, but a computing device coupled to the terminal and providing data for display is disposed separately from the terminal. In some embodiments, terminals 340 may be implemented as standalone devices, such as a kiosk disposed on the store floor or monolithic device disposed on a shelf or platform. In some embodiments, terminals 340 may be integrated partially or wholly with other components of the environment 100, such as input or output devices included with shelving or other structural components in the environment (e.g., components used for product display or storage). In some embodiments, terminals 340 may be modular and may be easily attachable and detachable to elements of the environment 100, such as the structural components.

Generally, terminals 340 may be distributed throughout the environment 100 and may enhance various phases of the person's transactions within the environment. For example, terminals 340 may include digital signage (i.e., included as an example of other terminals 355) disposed throughout the environment, such as included in or near aisles, endcaps, displays, and/or shelving in the environment. A person during a transaction may view and/or interact with the digital signage as he or she moves throughout the environment. The digital signage may be included in a static display or may be movable, such as including digital signage within a shopping receptacle. Terminals 340 may also include one or more types of terminals usable for completing checkout transactions, such as employee-manned POS terminals 345 and self-checkout terminals 350. In some cases, the terminals 340 that provide checkout functionality may be disposed within a designated checkout area within the environment 100.

In some embodiments, terminals 340 may provide an integrated functionality. For example, terminals 340 may function in a first mode as digital signage, and when engaged by a person (i.e., receiving input from the person), the terminals function in a second mode as a self-checkout terminal or other type of terminal.

Server 365 generally includes processor(s), memory, and communications capabilities and may perform various computing tasks to support the operation of the environment 100. Server 365 may communicate using various wired and/or wireless communications methods with terminals 340, sensors 305, and with other networked devices such as personal devices 330 and employee devices 335. Server 365 generally executes computer program code in which input data is received from networked devices, the input data is processed and/or stored by the servers, and output data is provided to networked devices for operation of the environment 100.

Network 360 may include one or more networks of various types, including a local area or local access network (LAN), a general wide area network (WAN), and/or a public network (e.g., the Internet). In one embodiment, various networked computing devices of the system 300 are interconnected using a LAN, and one or more computing devices (e.g., server 365, personal devices 330) include connections to the Internet.

Figure 4:
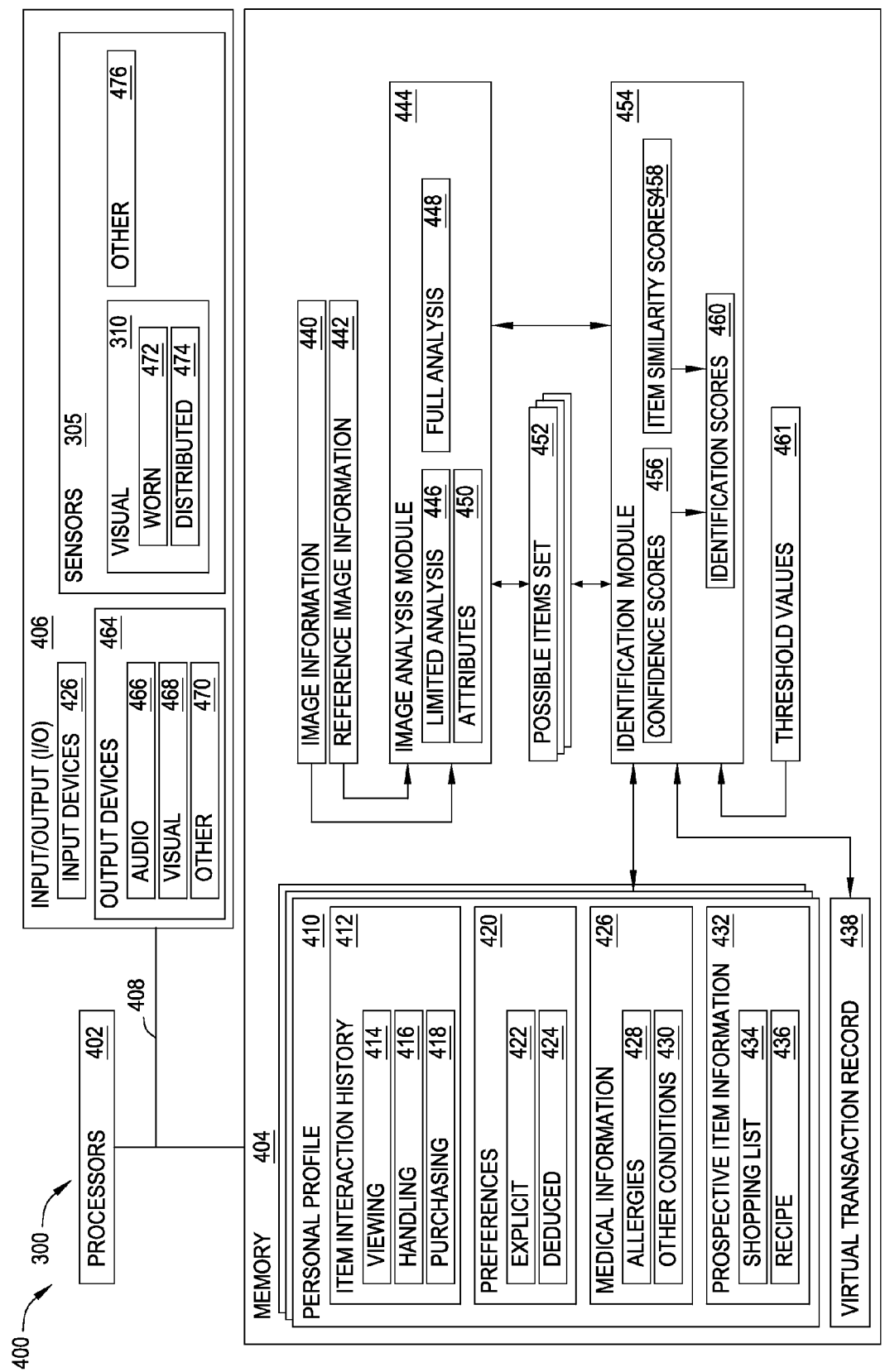
FIG. 4 is a block diagram illustrating operation of a system of visual identification of an item selected by a person, according to one embodiment.

FIG. 4 is a block diagram illustrating operation of a system of visual identification of an item selected by a person, according to one embodiment. Specifically, the arrangement 400 illustrates operation of the system 300. Arrangement 400 includes a number of processors 402, memory 404, and input/output 406, which are interconnected using one or more connections 408. In one embodiment, the arrangement 400 may be implemented as a singular computing device and connection 408 may represent a common bus. In other embodiments, arrangement 400 is distributed and includes a plurality of discrete computing devices that are connected through wired or wireless networking. The processors 402 may include any processing element suitable for performing functions described herein, and may include single or multiple core processors, as well as combinations thereof. Processors 402 may be included in a single computing device, or may represent an aggregation of processing elements included across a number of networked devices such as the personal devices 330, terminals 340, etc. discussed above.

Input/output (I/O) 406 includes one or more output devices 464 and one or more sensors 305. Output devices 464 include one or more devices for presenting information to customers and generally include audio output devices 466 and/or visual output devices 468. The audio output devices 466 may include conventional audio speakers having any suitable form factor (e.g., standalone, integrated in a stereo, headphones, etc.), as well as devices using alternative methods of producing sound perceptible by a person such as a customer or employee, such as bone conduction transducers in a worn device. Visual output devices 468 may include visual displays and various visual indicators such as light emitting diodes (LEDs). In some embodiments, the terminals 340, personal devices 330, and employee devices 335 of FIG. 3 may include output devices 464, such as visual devices 468 (e.g., visual displays, indicators) and/or audio devices 466 (e.g., speakers) for communicating with persons during their transactions. Other output devices 470 may provide information to customers through tactile feedback (e.g., haptic devices) or using other sensory stimuli. Sensors 305 may include visual sensors 310 which may be carried or worn sensors 472, and distributed sensors 474 that are disposed throughout the environment. In one embodiment, the distributed sensors 474 are disposed in a static arrangement in the environment. In one embodiment, at least some of the distributed sensors 474 are movable. For example, the distributed sensors 474 may be included on movable product displays or structures, and/or unmanned vehicles (e.g., aerial or ground-based vehicles). Other sensors 476 may also be included that are suitable for collecting information about a person and his/her interactions within the environment. Examples of other sensors 476 include without limitation infrared (IR) sensors, thermal sensors, weight sensors, capacitive sensors, magnetic sensors, sonar sensors, radar sensors, lidar sensors, and so forth.

I/O 406 may also include input devices 462 suitable for receiving input from persons, such as cameras, keyboards or keypads, touchscreens, buttons, inertial sensors, etc. I/O 406 may further include wired or wireless connections to an external network (e.g., network 360) using I/O adapter circuitry.

The visual sensors 310 may be used to capture one or more images (also referred to as image information 440) of the person and/or the environment, which may include views from various perspectives (e.g., a customer-worn visual sensor, static or movable visual sensors at various locations in the environment). The image information 440 may be stored in memory 404, and may be individually or collectively processed by processors 402 to determine information about persons within the environment and their respective interactions with items in the environment.

Memory 404 may include a variety of computer-readable media selected for their size, relative performance, or other capabilities: volatile and/or non-volatile media, removable and/or non-removable media, etc. Memory 404 may include cache, random access memory (RAM), storage, etc. Storage included as part of memory 404 may typically provide a non-volatile memory for the networked computing devices (e.g., server 365), and may include one or more different storage elements such as Flash memory, a hard disk drive, a solid state drive, an optical storage device, and/or a magnetic storage device. Memory 404 may be included in a single computing device or may represent an aggregation of memory included in networked devices. Memory 404 may include a plurality of modules for performing various functions described herein. The modules generally include program code that is executable by one or more of the processors 402. As shown, modules include an image analysis module 444 and identification module 454. The modules may also interact to perform certain functions. For example, identification module 454 may make calls to the image analysis module 444 and receive item similarity scores 458. The person of ordinary skill will recognize that the modules provided here are merely non-exclusive examples; different functions and/or groupings of functions may be included as desired to suitably operate the environment.

Memory 404 includes a plurality of personal profiles 410 corresponding to the different persons. In some cases, the personal profiles 410 may be associated with a loyalty program administered in the environment. During operation of the system 300, the personal profiles 404 may be associated with a current transaction for a person after identifying the person using the person's portable computing device (e.g., a login using a phone app), a visual scan of the person's loyalty card or the person's face or other identifying features, etc. In one embodiment, the personal profiles 410 and image information 440 may be stored on the server 365 or on a separate database.

The personal profiles 410 include a number of different types of information that may be useful to augment visual identification of items. An item interaction history 412 may reflect the person's interactions with various items in the environment, which may have occurred during previous transactions and/or earlier during the current transaction. The item interaction history 412 may be adaptively updated as image information is acquired and the person's identified interactions are added into the virtual transaction record 438. Some non-limiting examples of item interactions include viewing items 414, handling items 416, and purchasing items 418. The item interactions may be directly observed and/or deduced using visual sensors 310 in the environment. In one example of direct observation, a person wears a forward-looking visual sensor that generally represents their field of view (i.e., including viewed items) at a given time. In one example of a deduced observation, a gaze-tracking camera tracks the eye movement of the person, but its information alone may be unable to discern what items the person is viewing. However, using image information to determine the person's position within the environment and the relative orientation of their head, and perhaps referenced with item location information, the system may be able to determine what items are being viewed by the person and add this information into the viewing items 414 portion of the item interaction history 412.

Personal profiles 410 also include personal preferences 420 reflecting preferences that are explicitly specified by the person, or that may be deduced by the system based on other information included in the personal profile 410, such as the person's item interaction history 412. The person may specify preferences using a personal computing device (e.g., through a mobile computing device app) or through terminals or other computing devices accessible in the environment. Personal preferences 420 may reflect preferences of one item in relation to another (e.g., apples tend to be purchased at the same time as oranges), one grouping of items in relation to another (e.g., junk food preferred over vegetables), transaction preferences, and so forth. In one example, a person may prefer to purchase their fresh produce during a certain transaction that occurs with some regularity, say every couple of weeks. Therefore, when a first item is selected that is positively identified as a fresh vegetable, it is likely that a significant number of other items in the same transaction will also be fruits and/or vegetables. This information may be used to help identify items detected by the image analysis.

Personal profiles 410 may also include medical information 426 for the person. For example, a person could specify that they have certain allergies 428 to certain items such as nuts, shellfish, eggs, etc. In some embodiments, allergies 428 may be used to remove certain possible items from consideration, as it would be highly unlikely that the person would be selecting an item to which they are allergic. Medical information 426 may also include one or more other conditions 430, which, although not as serious as an allergy 428, may still cause discomfort to the person. For example, oils in mango skin may cause dermatitis for persons who are sensitive to poison ivy. Items related to the other conditions 430 are also generally less likely to be selected by the person during a transaction.

Personal profiles 410 may also include prospective item information 432 that suggests that a person may select a particular type of item during the transaction. The prospective item information 432 may be indicated by the person or deduced. For example, the person may enter a shopping list 434 using a mobile computing device app, and the items listed therein are very likely to be selected by the person during the transaction. In another example, a recipe 436 is entered by the person in the mobile computing device app (e.g., the person wishes to purchase the component ingredients to prepare the recipe). Alternatively, recipes may be stored in the system 400 and accessed responsive to a number of items previous identified during the transaction. For example, say a person selects containers of peanut butter and of jelly during a particular transaction. The system may search for recipes that include both of those ingredients—one of which is a peanut butter and jelly sandwich. Based on the information in this recipe 436, it is more likely that the person will also select bread during the transaction. Accordingly, a visually detected item with physical attributes roughly corresponding to a loaf of bread (e.g., having an approximate size and shape as the loaf) may be more easily identified as the loaf of bread, without the need for full image processing and comparison with reference image information.

Memory 404 may include a virtual transaction record 438 reflecting the person's item interactions and determined using acquired image information. In some embodiments, the virtual transaction record 438 is included in the personal profile 410; in some embodiments, the two may be separately maintained in memory 404. The person's interactions with different items may be identified using image information, and those interactions stored in the virtual transaction record 438. When items are identified as being selected by the person, the selected items may be added to item lists (e.g., a virtual cart) within the virtual transaction record 438. The item lists are then used as part of completing the checkout transaction. In some cases, as the virtual transaction record 438 is updated, corresponding portions of the item interaction history 412 are also updated.

Image information 440 is generally acquired using the visual sensors 310. The image information 440 may be maintained in any form suitable for performing image analysis—one or more still images, video, and so forth. In some cases, the image information 440 does not include labeling (such as a universal product code (UPC) or quick response (QR) code) or other encoded information that is sufficient to uniquely identify the item. In some cases, the image information 440 includes some encoded information, but not enough to positively identify the corresponding item (e.g., the barcode is partially obscured). In some embodiments, partial encoded identification information may be used to narrow a set of possible items. The reference image information 442 generally represents imagery including various items and used for comparison with acquired image information 440 to identify items included therein. As discussed above, reference image information 442 may be intentionally simplified, such as acquiring the reference image information under controlled conditions, including only a singular item within the reference image information, and so forth.

Image analysis module 444 is configured to receive image information 440 and/or reference image information 442 as inputs, and performs analysis according to any suitable techniques. Generally, the image analysis module 444 may perform edge detection or comparable techniques to define areas within the image information 442 that correspond to different items. The analysis performed by the image analysis module 444 may be subdivided into a plurality of levels—as shown, a limited analysis 446 and a full analysis 448 may be performed as desired on received image information. In some cases, the functionality of the limited analysis 446 may overlap with that of the full analysis 448. In one embodiment, the limited analysis 446 is performed on the image information 440 to determine one or more physical attributes 450 of the detected item. Non-limiting examples of the attributes 450 include color, shape, size, etc. The attributes 450 may be coarse, that is, intentionally including a degree of imprecision, reflecting the fact that some of the item may be visually obscured in the image information. For example, instead of maintaining pixel-by-pixel color information for the item, an example coarse attribute might be a predominant color (e.g., averaged) or a color range. Another example of a coarse attribute is a broad category of shape—items might be described as rounded, and not a more specific rounded shape (e.g., spherical or egg-shaped). Yet another example of a coarse attribute is a size range—say, an item has a width between two and five inches.

The image analysis module 444 may determine one or more sets 452 of possible items that may match the detected but not-yet-identified item. In one embodiment, the possible items sets 452 may be determined by performing analysis on the reference image information 442 (e.g., the limited analysis 446) and determining attributes of items depicted in the reference image information 442. The determined (reference) attributes may be compared with the determined attributes 450 for the image information, and a possible items set 452 produced including items having (reference) attributes that match those attributes 450 determined for the image information 440. In another embodiment, the attributes of the reference items may be predetermined and those values compared with the determined attributes 450, without requiring a contemporaneous image analysis of the reference image information 442.

Identification module 454 is configured to receive a possible item set 454, as well as information regarding the image analysis, information from personal profile 410, and information from the virtual transaction record 438. The identification module 454 may be configured to perform one or more intermediate functions using the received information before generating identification scores 460 indicating the relative strength of classifying the detected item as each of the possible items of the item set 454. The identification scores 460 are based both on image analysis and personal profile information.

Figure 10:
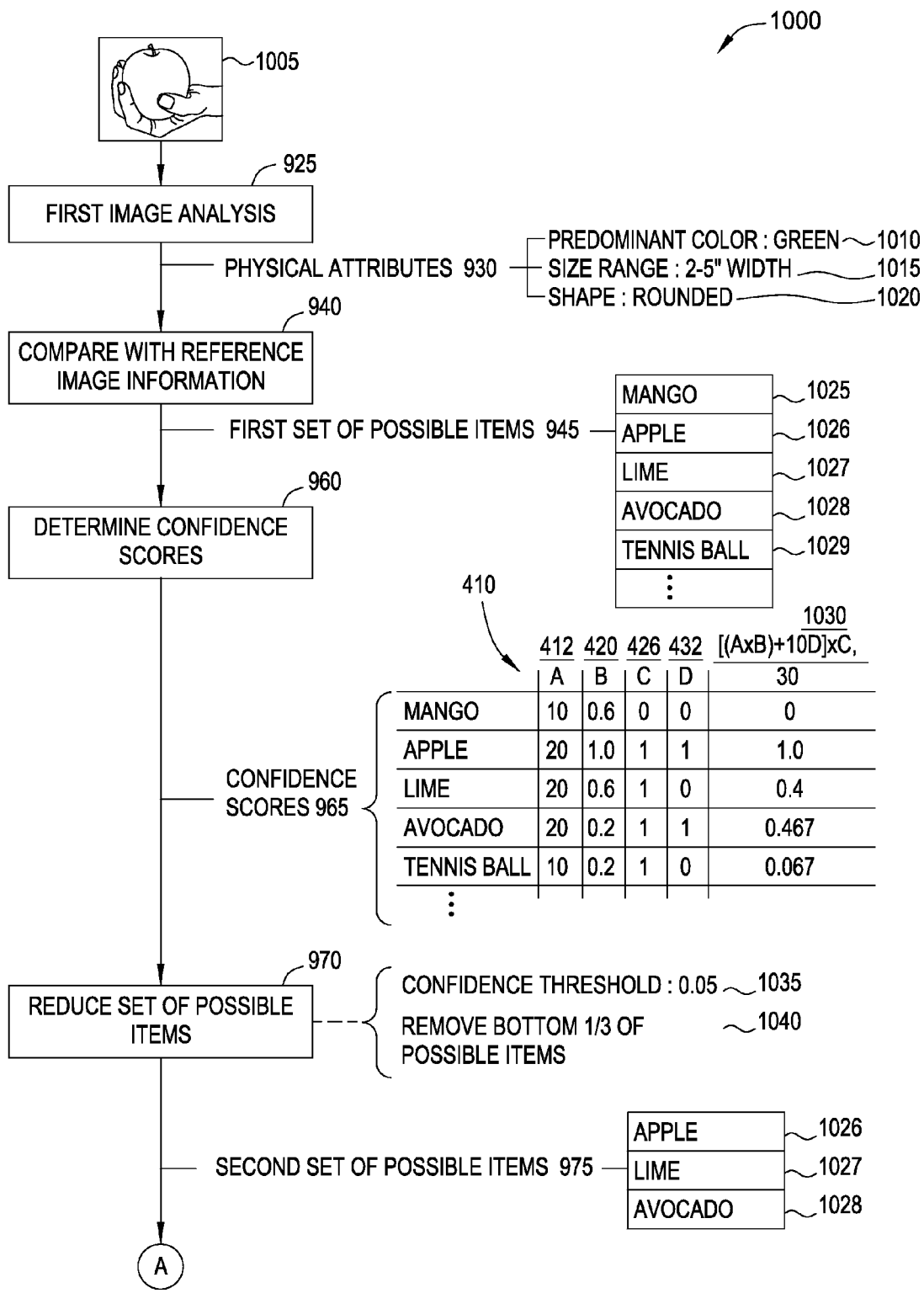
FIG. 10 illustrates an exemplary item selection and identification, according to one embodiment.
Figure 10:
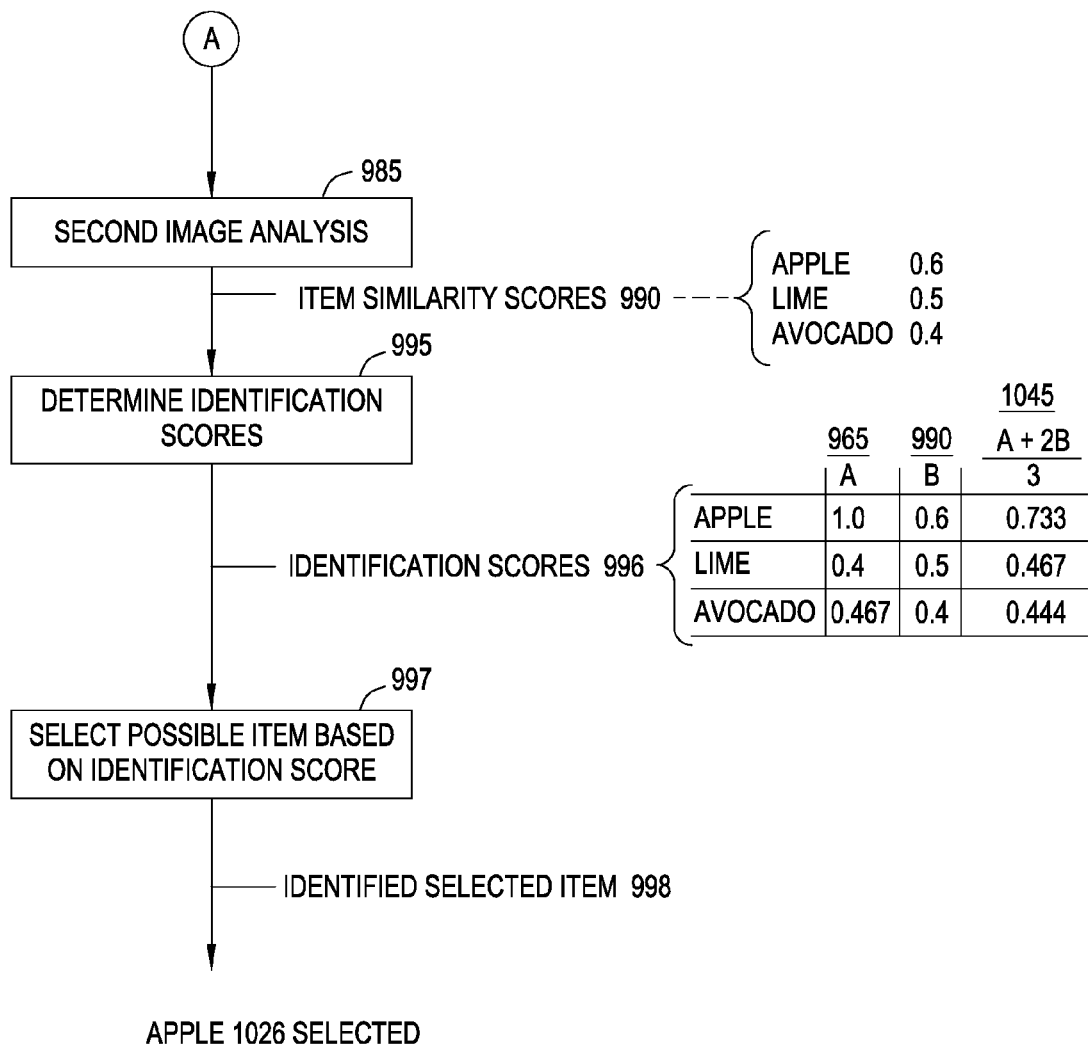

The identification module 454 may be further configured to produce confidence scores 456 for the items included on the received possible items set 452, based on the received personal profile information. Generally, the confidence scores 456 reflect a likelihood that the particular possible item was selected by the person. The confidence score 456 may be determined using any suitable algorithm, which may consider some or all of the item interaction history 412, preferences 420, medical information 426, and prospective item information 432. In one example, a weighted combination of portions of the personal profile 410 is used to determine the confidence scores. An example of calculating confidence scores is illustrated in FIG. 10.

The identification module 454 receives image analysis results—that is, some measure of similarity of the acquired image information to the reference image information from the image analysis module 444. The image analysis results may be produced by the limited analysis 446 and/or by the full analysis 448. The identification module 454 may perform additional processing to the received analysis results values (such as scaling or normalizing) as part of generating item similarity scores 458. In another embodiment, the received values are stored without modification as the item similarity scores 458, and any scaling or normalizing may occur later as part of the determination of identification score 460.

The identification module 454 may also receive one or more threshold values 461. The threshold values may correspond to one or more of the types of scoring. For example, say a particular possible item has a confidence score 456 that fails to meet a corresponding confidence threshold value. The possible item may be removed from further consideration (e.g., so that no full analysis 448 is performed corresponding to the removed item). In one embodiment, removing the possible item includes producing a reduced possible items set 452. Other computations related to the possible item may not be performed when a threshold value 461 is not met—e.g., there is no need to calculate an identification score for a removed item.

In some embodiments, a limited analysis 446 is performed on the image information to produce a first possible items set 452. The identification module 454 receives the first possible items set and determines confidence scores 456 for each of the possible items. The identification module 454 may apply one or more rules that operate to remove one or more of the possible items of the first possible items set 452 from further consideration, based on the determined confidence scores. For example, if the confidence score for a particular possible item is smaller than a corresponding threshold value 461, the possible item may be removed from the set. The result of the operation is a second, reduced possible items set (no reference number). The image analysis module 444 may receive the second, reduced possible items set and perform a full analysis 448 for the possible items included therein. Based on the results of the image analysis and the confidence scores, identification scores are determined for each of the second possible items set.

In one embodiment, the possible item corresponding to the largest identification score may be selected to identify the detected item from the image information 440 (e.g., concluding that the person is holding item x). The virtual transaction record 438 may then be updated based on the identification of the item, such as by adding an entry noting the interaction and the identified item. Based on the determined type of interaction, the item list of the virtual transaction record 438 may also be updated. Similarly, the person's item interaction history 412 (handling 416) may be updated based on the identified item. Information derived from the item interaction history 412—such as preferences 420—may also be updated.

In some embodiments, the person may be prompted using an output device 464 (e.g., a display included in the person's mobile computing device) with the identified item to confirm the accuracy of the identification. In some embodiments, the person provides corresponding input using an input device 462 (e.g., a touchscreen of the computing device). Based on the provided input, the system may adapt aspects of personal profile 410, as well as associations within the image analysis module 444 and/or the identification module 454 to more accurately identify subsequently detected items. For example, the system may adapt the weighted relationship between different portions of the personal profile 410 for generating the confidence scores 456. The person of ordinary skill in the art will understand that various techniques may be used to improve the classification performance of the image analysis module 444.

In some embodiments, when the person provides input indicating that the item has been incorrectly identified, the system may present a second possible item corresponding to the next largest identification score, and ask the person to confirm whether the second possible item is the correct item. The process may be repeated with subsequent possible items until the person is able to confirm a correct identification. In some cases, a limit value may be imposed on the number of item presentations to the person. For example, the system prompts the person with the first (selected) possible item, a second possible item when the first possible item is incorrectly identified, and a third possible item when the second possible item is incorrectly identified. After the third possible item is indicated as incorrectly identified, the system may prompt the person directly to identify the item, may request employee assistance for the person, may flag the transaction to be audited at checkout, etc.

Figure 5:
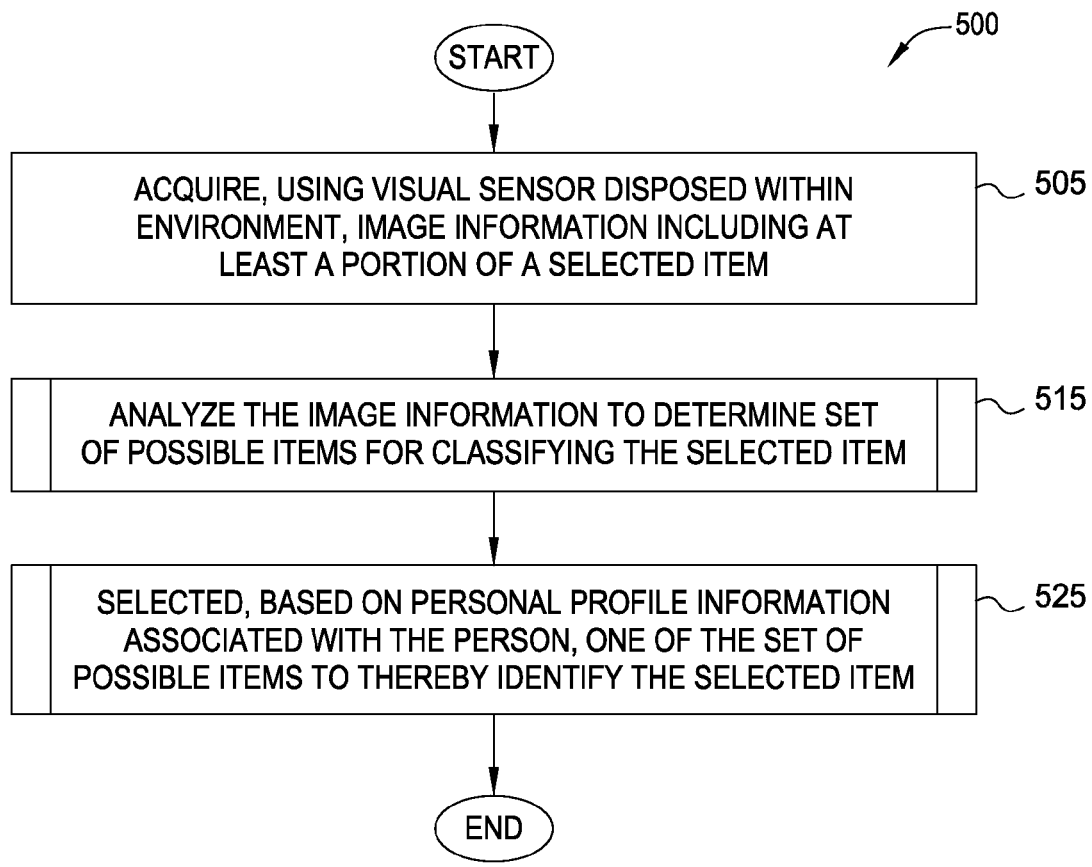
FIG. 5 illustrates a method 500 of visual identification of an item selected by a person during a transaction within an environment having a plurality of items, according to one embodiment.

FIG. 5 illustrates a method 500 of visual identification of an item selected by a person during a transaction within an environment having a plurality of items, according to one embodiment. Method 500 begins at block 505, where a visual sensor within the environment is used to acquire image information that includes at least a portion of an item selected by the person. In some cases, the image information may include one or more objects that visually obscure part of the item, such as the person's hand, other items, and/or portions of a shopping receptacle.

At block 515, the image information is analyzed to determine a set of possible items for classifying (identifying) the selected item. In some embodiments, coarse attributes of the selected item may be determined, and the coarse attributes compared with the attributes of different possible items. In one embodiment, reference image information is analyzed to determine the attributes of the different possible items. In another embodiment, the attributes may be stored as text or tabular data, and compared with the determined coarse attributes.

At block 525, one of the set of possible items is selected based on personal profile information associated with the person. The personal profile information may include different types of information, such as item interaction history for the person, personal preferences, medical information, prospective item information, and so forth. In some embodiments, the acquired image information is compared with reference image information for a set of possible items, and the personal profile information is used to increase or decrease the likelihood of certain possible items matching the selected item.

Figure 6:
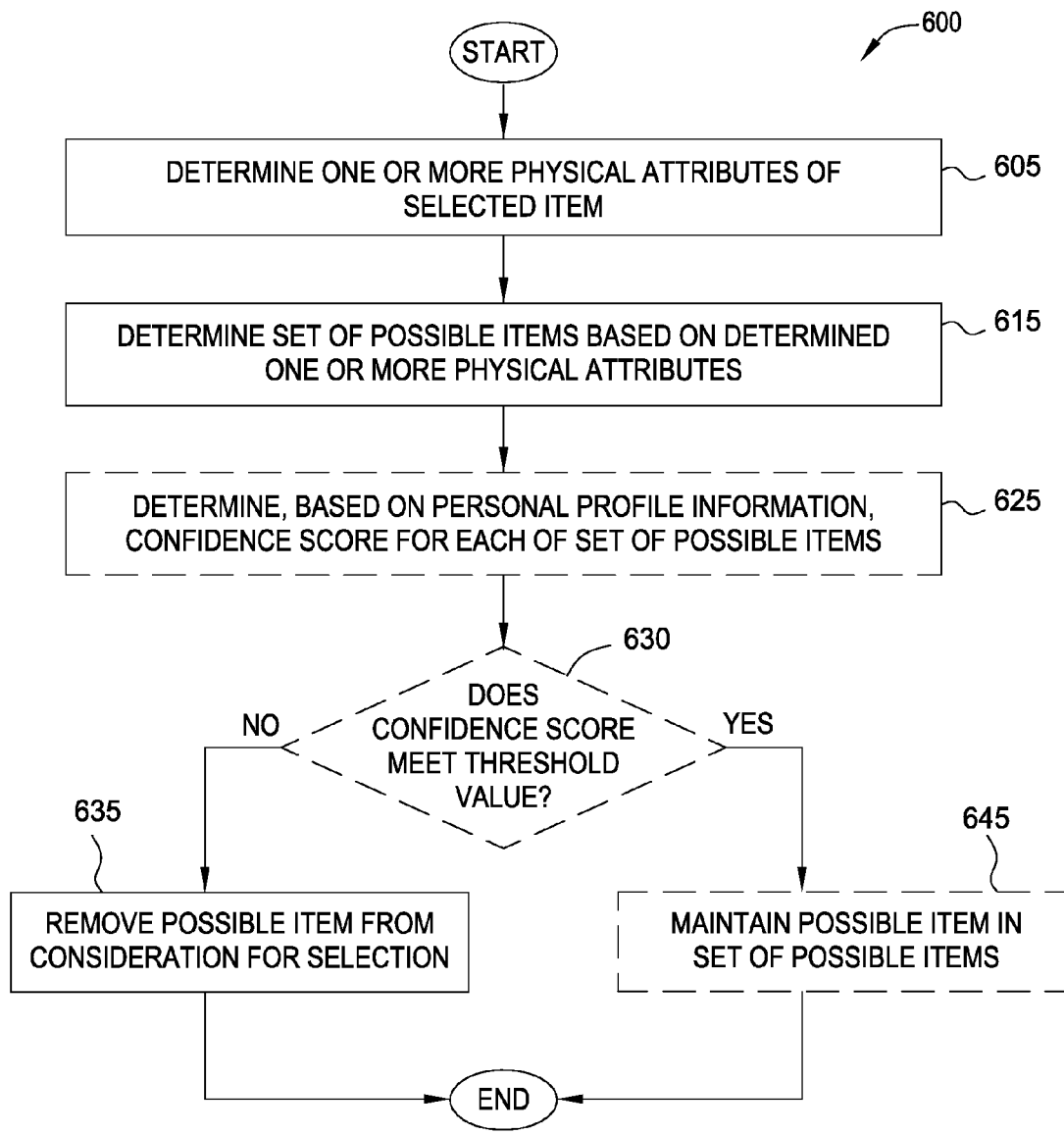
FIG. 6 illustrates a method 600 of analyzing acquired image information including a selected item to determine a set of possible items for classifying the selected item, according to one embodiment.

FIG. 6 illustrates a method 600 of analyzing acquired image information including a selected item to determine a set of possible items for classifying the selected item, according to one embodiment. The method 600 may be included as part of block 515 of method 500.

Method 600 begins at block 605, where one or more physical attributes are determined for the selected item. The image analysis performed in conjunction with this block may be limited from a full analysis of the image information. In some embodiments, the physical attributes includes one or more "coarse" physical attributes that intentionally include a measure of imprecision to reflect that the selected item may be partially visually obscured in the image information. Some examples of coarse physical attributes include a predominant color of the item, a broad category of shape, and a size range.

At block 615, a set of possible items is determined based on the determined physical attributes. Generally, the possible items are selected for inclusion in the set based on a measure of similarity to the determined physical attributes. In one embodiment, the set of possible items is determined by performing image analysis on reference image information and determining corresponding attributes of the items depicted in the reference image information. In another embodiment, the attributes of the reference items are predetermined, and the attribute values are compared with the determined physical attributes without requiring a contemporaneous image analysis of the reference image information.

At the optional block 625, a confidence score is determined for each of the set of possible items. The confidence score is based on the personal profile information, and generally indicates a likelihood that the particular possible item was selected by the person. The personal profile information may include historical item interaction information, personal preferences, medical information, as well as prospective item information. The confidence score may be based on a weighted combination of some or all of the portions of the personal profile.

At the optional block 630, the system determines whether the determined confidence score meets a confidence threshold value. If the threshold value is not met ("NO"), the method proceeds to block 635, where the corresponding item is removed from consideration for selection as the identified item. However, if the threshold value is met ("YES"), the method proceeds to block 645, and the corresponding item is maintained in the set of possible items. Additionally or alternatively, one or more rules may be applied based on the confidence scores. For example, even though a particular possible item has a confidence score meeting the threshold value, the possible item may still be removed based on an enforced rule, e.g., requiring possible items having confidence scores in the bottom 1/3 to be removed from consideration. In some embodiments, the reduced set of possible items is used when performing a full image analysis to compare the possible items with the acquired image information.

Figure 7:
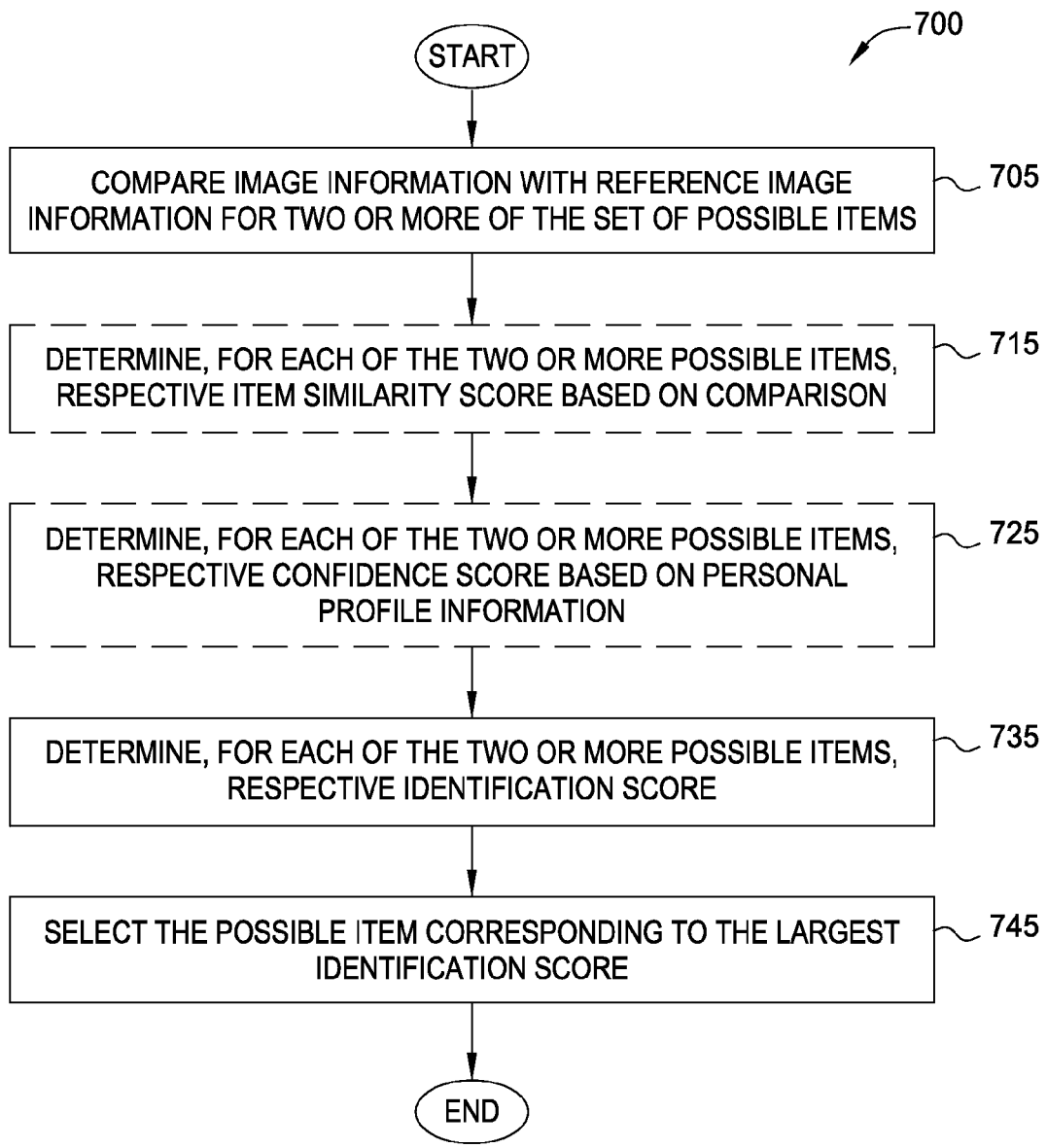
FIG. 7 illustrates a method 700 of selecting one possible item of a set of possible items based on personal profile information, according to one embodiment.

FIG. 7 illustrates a method 700 of selecting one possible item of a set of possible items based on personal profile information, according to one embodiment. The method 700 may be included as part of block 525 of method 500.

Method 700 begins at block 705, where image information is compared with reference image information for two or more of the set of possible items. In some embodiments, the set of possible items is reduced from an initial set of possible items based on personal profile information. Any suitable image processing techniques may be used to make the comparison.

At optional block 715, and for each of the two or more possible items, a respective item similarity score is determined based on the comparison. In some embodiments, the item similarity score is the resulting values from the comparison of block 705. In other embodiments, the resulting values are further processed (e.g., scaling or normalizing) as part of generating the item similarity scores.

At optional block 725, a respective confidence score for each of the two or more possible items is determined based on personal profile information. Determining a confidence score is discussed above with respect to block 625 of method 600. In some embodiments, the confidence scores may not be determined earlier, e.g., to remove one or more items from the set of possible items.

At block 735, a respective identification score for each of the two or more possible items is determined. The identification scores reflect both the results of the image analysis and the personal profile information. In some embodiments, the identification scores are a function of the determined item similarity scores and the confidence scores.

At block 745, the possible item corresponding to the largest identification score is selected. The detected item from the image information is thus "identified" as the selected possible item. In some embodiments, the system may further prompt the person to confirm the accuracy of the identification.

Figure 8:
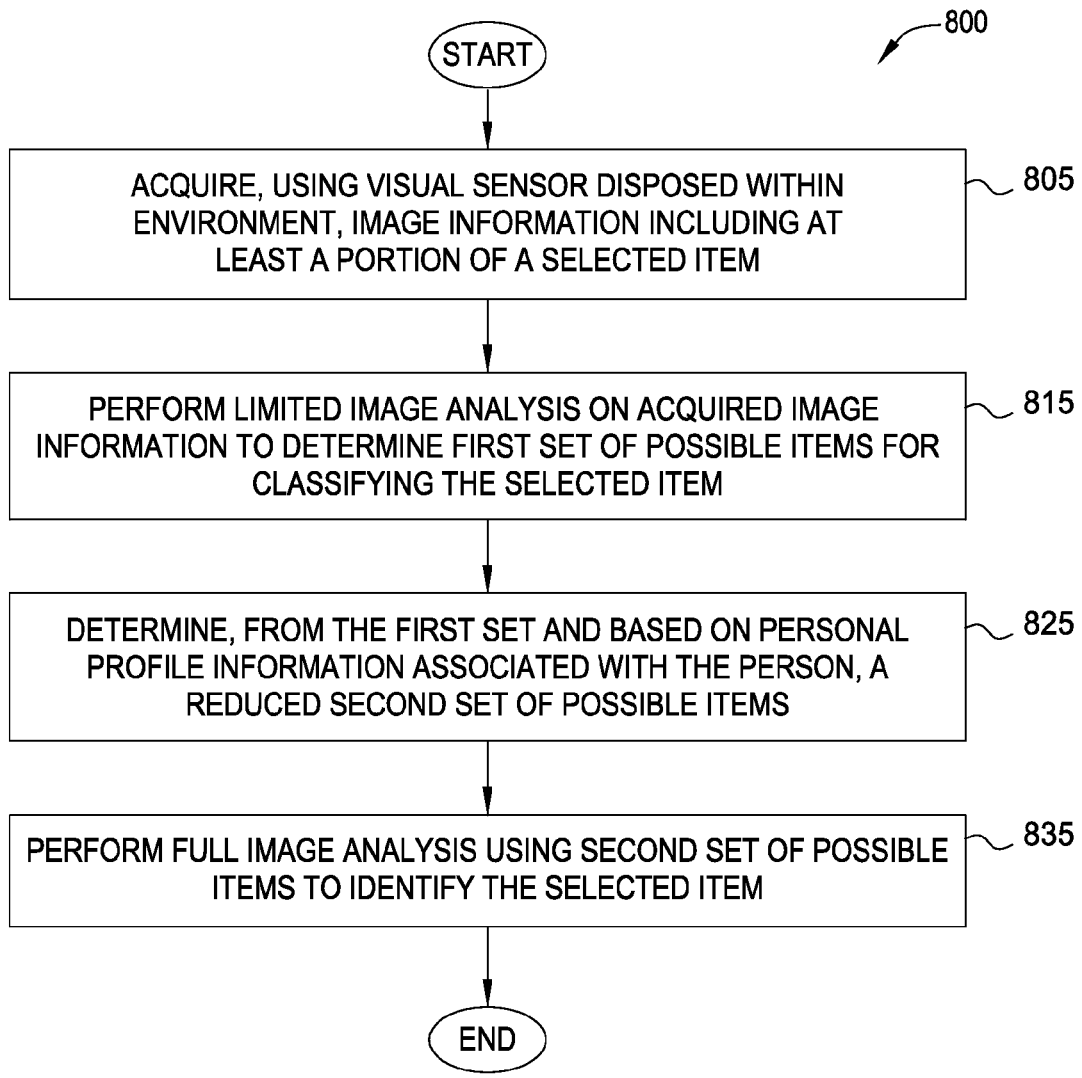
FIG. 8 illustrates a method 800 of reducing the complexity of visual identification of an item selected by a person during a transaction within an environment, according to one embodiment.

FIG. 8 illustrates a method 800 of reducing the complexity of visual identification of an item selected by a person during a transaction within an environment, according to one embodiment.

Method 800 begins at block 805, where image information is acquired using a visual sensor disposed in the environment. The image information includes at least a portion of the selected item.

At block 815, a limited image analysis is performed on the acquired image information to determine a first set of possible items for classifying the selected item. In some embodiments, the limited analysis may determine one or more physical attributes of the selected item. Any suitable image processing techniques may be used in conjunction with this analysis. In some embodiments, the physical attributes may be coarse, including imprecision to reflect that the selected item may be visually obscured in the image information.

The first set of possible items is generally determined based on a measure of similarity to the image information. In some embodiments, the attributes of the possible items are compared with determined physical attributes to determine whether each of the possible items should be included in the set. For example, if the physical attributes specify an item width of two to four inches, but one possible item has a width range of between five and eight inches, there is no overlap in the ranges, and so the possible item may not be included in the set. However, if another possible item corresponds to a width of three inches (say, based on an analysis of reference image information), this possible item may be included in the set.

At block 825, a reduced second set of possible items is determined from the first set of possible items, and based on the personal profile information. While at block 815, certain possible items may have been excluded from the first set due to incompatibility of the physical attributes or general dissimilarity of the image information, at block 825 the first set of compatible possible items is reduced based on the personal profile indicating the person's preferences, item history, etc. In some embodiments, a confidence score is determined for each of the first set of possible items. Determining one or more items to remove from the first set may be based on the confidence score not meeting a threshold value, or based on other confidence score-based rules.

In some cases, it may be advantageous to reduce the first set of possible items as far as is reasonably possible. For each additional possible item that remains in the set, image analysis may be required for a number of different reference images corresponding to the possible item. Therefore, the associated processing costs may tend to increase exponentially with incremental increases to possible items included in a set. Accordingly, aggressive rules and/or threshold values may be enforced to suitably reduce the sets of possible items.

At block 835, a full image analysis is performed using the second set of possible items in order to identify the selected item. Any suitable image processing techniques may be used when comparing the image information with the reference image information corresponding to the second set of possible items.

Figure 9:
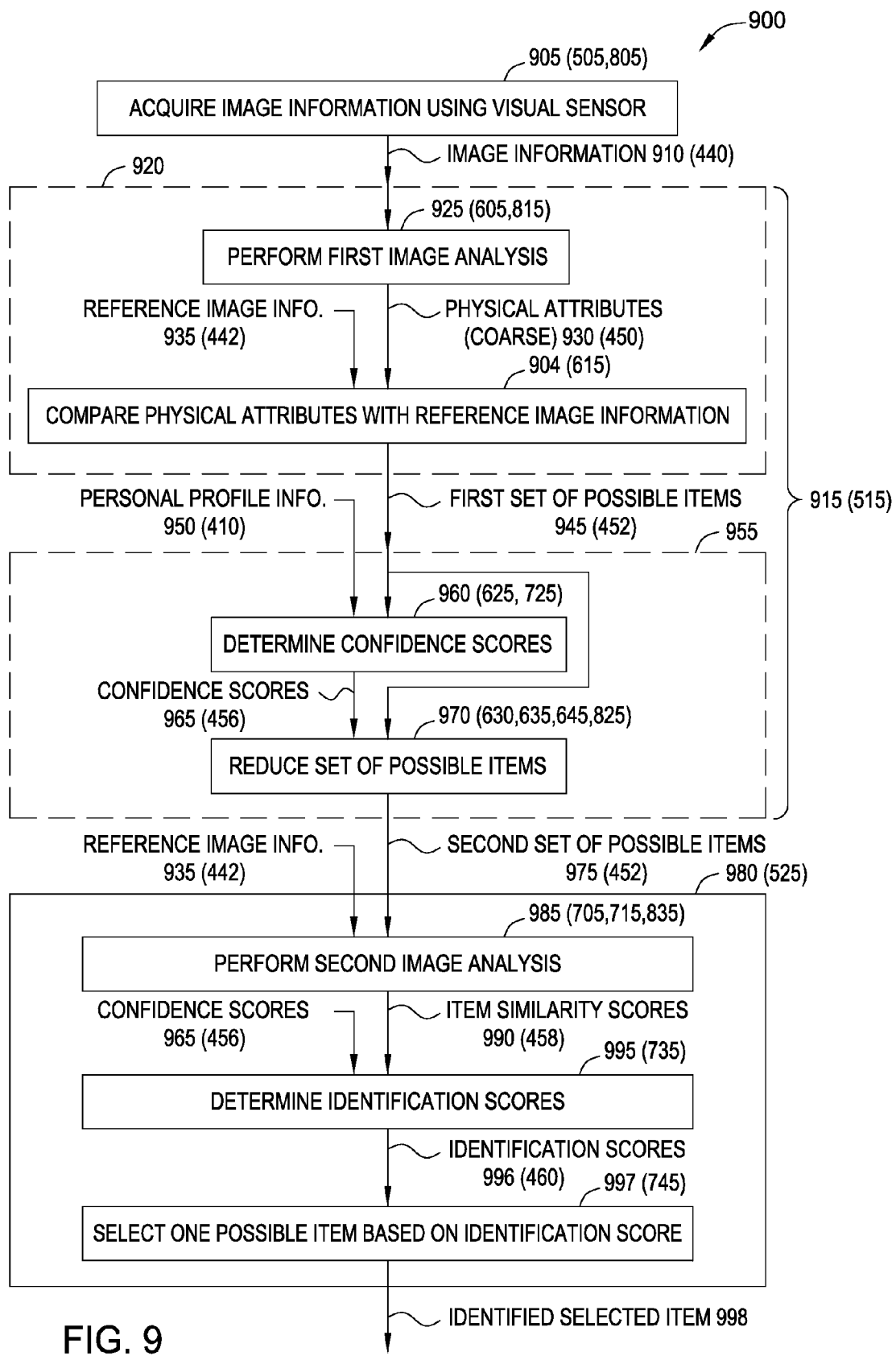
FIG. 9 illustrates an exemplary interaction of the methods 500, 600, 700, 800, during visual identification of an item selected by a person, according to one embodiment.

FIG. 9 illustrates an exemplary interaction of the methods 500, 600, 700, 800, during visual identification of an item selected by a person, according to one embodiment. Reference numbers to corresponding blocks or functions in FIGS. 5-8, as well as components of the system 400 of FIG. 4, have been provided wherever practical. The operation of diagram 900 begins at block 905, where image information is acquired using a visual sensor. Block 905 generally corresponds to blocks 505 and 805.

The image information 910 (block 440) is received at a first image analysis block 915 (block 515), which may be subdivided into blocks 920 and optional block 955. Within block 920, first image analysis is performed on the received image information 910 at sub-block 925 (605, 815). In some embodiments, determined coarse physical attributes 930

(450) and reference image information 935 (442) are received at sub-block 940 (615), where the physical attributes are compared with the reference image information. The output of the first image analysis block 915 (515) is a first set of possible items 945 (452).

The first set of possible items 945 may advantageously be reduced further based on personal profile information 950 (410). The first set of possible items 945 (452) and personal profile information 950 are received as input to sub-block 960 (625, 725), where confidence scores 965 (456) are determined for each of the first set of possible items 945 (452). The confidence scores 965 and the first set of possible items 945 are received as input to sub-block 970 (630, 635, 645, 825), where the set of possible items is reduced based on the confidence scores. The output of sub-block 970 is a reduced second set of possible items 975 (452).

A set of possible items is provided to a second image analysis block 980 (525). In some embodiments, the second set of possible items 975 is provided to the second image analysis block 980. In some embodiments, no reduction of the first set of possible items 945 occurs (i.e., no block 955), and the first set of possible items 945 is provided to the second image analysis block 980.

As shown, the second set of possible items 975 is received as input to sub-block 985 (705, 715, 835), where second image analysis is performed. The second image analysis at sub-block 985 may have a scope greater than the first image analysis. Item similarity scores 990 (458) generated at sub-block 985 are received as an input to sub-block 995 (735), where identification scores 996 (460) are determined. The confidence scores 965 may also be an input to the sub-block 995. The identification scores 996 are received as input to the sub-block 997 (745), which selects one of the possible items based on the identification score. In some embodiments, the identified selected item 998 corresponds to the largest identification score.

FIG. 10 illustrates an exemplary item selection and identification, according to one embodiment. Where appropriate, diagram 1000 includes FIG. 9 reference numbers. As shown, the image information 1005 is acquired using a visual sensor. Generally, the image information 1005 may be similar to the image information 225, described above, in which a person holds an item. A first image analysis is performed on the image information 1005 at block 925. The first image analysis may be limited in scope, and generates a plurality of physical attributes 930, which may be considered coarse. As shown, the physical attributes 930 include a predominant color 1010 (green), a size range 1015 (a width between 2-5"), and a shape 1020 (rounded).

The physical attributes 930 are compared with reference image information at block 940. Based on the comparison, a number of different possible items are determined that meet the determined physical attributes, forming a first set of possible items 945. The first set of possible items 945 includes a mango 1025, an apple 1026, a lime 1027, an avocado 1028, and a tennis ball 1029. Of course, additional items may be included in the first set 945.

At block 960, confidence scores 965 are determined for each of the items of the first set of possible items 945. The confidence scores 965 are generally based on personal profile 410 information. While a number of different scores A-D corresponding to different categorical portions of the personal profile 410 are shown (item interaction history 412, preferences 420, medical information 426, prospective item information 432), the person of ordinary skill will understand that scores may be assessed for different portions of the personal profile (such as certain sub-portions of the categories), and combined in any suitable manner to determine the overall confidence score 965.

Score A corresponds to item interaction history 412. Generally, score A may be based on the number and/or type of interactions of the person with the particular item. For example, say the person has at one time during previous transactions (or earlier during the current transaction) viewed, handled, and purchased an apple 1026 but has only viewed a mango 1025. Accordingly, the score A for the apple 1026 may be higher (20) than that for the mango 1025 (10). Of course, these score values have been selected for purposes of the example, but any other values and ranges may be used.

Score B corresponds to personal preferences 420. The preferences 420 may reflect relative preferences for individual items, groups, or categories of items, etc. For example, say the person historically purchases at least one apple during each transaction. The score B preference value for apples may be a 1.0 (on a scale of 0-1), as it is very likely that the person will again purchase an apple during the current transaction. Of course, one or more preference values may apply across groups of items. For example, the person may have indicated a reasonably strong preference for fruits, which may correspond to a default value of 0.6 applied to all fruit items (mango, lime). Of course, the values may vary from a category default value based on interactions with the individual items. One or more default values may be applied to other items for which no other preferences are available (say, 0.2 for the avocado and tennis ball).

Score C corresponds to medical information 426. For example, say that the person has indicated no allergies to any of the first set of possible items 945, but does have a strong discomfort caused by dermatitis when handling mangoes. In some embodiments, certain of the scores A-D may be binary to emphasize items of the category having a particularly pronounced effect on the confidence score. For example, the score C value may be zero for mangoes, while one for all the other possible items; as will be seen, these values may be used as multipliers to influence the confidence score.

Score D corresponds to prospective item information 432. For example, the person may have entered a shopping list that includes an apple and an avocado (receiving one values), but not the other items (receiving zero values).

The scores A-D may be combined using any suitable function, which may or may not be adaptively updated. As shown, the function 1030 is $[[(A \times B)+10D] \times C]/30$, which generates a normalized confidence score. Notably, score C performs a quasi-filtering function—the confidence score becomes zero for items that are known to exacerbate medical conditions (i.e., mango), as it is quite unlikely that the person would want to select such an item. For all other items, the confidence score is calculated as normal.

Following calculation of the confidence scores 965, the set of possible items may be further reduced at block 970. For example, a confidence threshold value 1035 may be applied, such that any item having a confidence score less than the confidence threshold value 1035 will not be further considered for selection. Here, mango 1025 has a confidence score of zero, owing primarily to the medical effects on the person. The mango 1025 may thus be removed from the set of items. Additionally, one or more rules may be applied based on the confidence scores. Rule 1040 requires that the bottom ⅓ of the possible items in the set be removed. Accordingly, though the tennis ball 1029 has a confidence score larger than the confidence threshold value, the tennis ball 1029 is also removed from the set of items by virtue of having the second-lowest confidence score. Thus, the remaining second set of possible items 975 includes the apple 1026, lime 1027, and avocado 1028.

The second set of possible items 975 undergoes second image analysis at block 985. This image analysis may be a "full" image analysis to determine relative similarity between each possible item and the depicted item in the image information. The image analysis may be performed according to any suitable techniques. The output of block 985 is the item similarity scores 990: here, the apple receives a score of 0.6, the lime 0.5, and the avocado 0.4.

The identification scores 996 are determined at block 995 based on the item similarity scores 990 and the confidence scores 965. The identification scores 996 may use any suitable combination of the item similarity scores 990 (column B) and the confidence scores 965 (column A). Here, the block 995 produces a normalized score using the function 1045: (A+2B)/3. As shown, the apple receives an identification score 996 of 0.733, the lime receives a score of 0.467, and the avocado receives a score of 0.444. Of course, any alternative scoring and values are possible.

At block 997, one of the possible items is selected based on the identification score 996. In many cases, the possible item corresponding to the highest identification score 996 is selected. Here, the identified selected item 998 is the apple 1026. Consistent with other embodiments discussed herein, the identification may be presented to the person through an output device. The person may confirm the identification as correct or may indicate that the identification is incorrect. If incorrect, the possible item having next highest identification score—here, the lime 1027—may be presented to the person.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module," or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a user may access applications (e.g., a retail store app for a mobile computing device) or related data (e.g., compiled shopping data) available in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method of visual identification of an item selected by a person during a transaction, the transaction occurring within an environment having a plurality of items corresponding to a plurality of predefined item types, each item type of the predefined item types having a predefined association with respective item information stored in a computer-readable memory, the method comprising:

acquiring, using a visual sensor disposed within the environment, image information that includes at least a portion of the selected item;

analyzing, using image processing techniques performed by one or more computer processors communicatively coupled with the visual sensor, the image information to determine a set of possible items of the plurality of items for classifying the selected item;

accessing, using the one or more computer processors, personal profile information stored in the computer-readable memory and associated with the person, the personal profile information being associated with one or more items of the plurality of items;

selecting, based on the personal profile information, one of the set of possible items to thereby identify the selected item as one item type of the plurality of predefined item types; and updating, based on the item information associated with the one item type, one or both of the personal profile information and a virtual transaction record stored in the computer-readable memory, the virtual transaction record associated with the person during the transaction.

2. The method of claim 1, wherein the one or more items associated with the personal profile information includes one or more of: an item indicated by historical item interaction information, an item indicated by personal preference information, and an item indicated by medical information.

3. The method of claim 1, wherein analyzing the image information comprises:
   determining one or more physical attributes of the selected item based on the image information; and
   determining the set of possible items based on matching the determined one or more physical attributes with the item information stored in the computer-readable memory, and
   wherein the one or more items associated with the personal profile information are used to remove one or more possible items from the set of possible items from consideration for selection.

4. The method of claim 3, further comprising:
   determining, for each possible item of the set of possible items and based on the personal profile information, a respective confidence score indicating a likelihood that the corresponding possible item was selected by the person,
   wherein the one or more possible items are removed from consideration when the corresponding confidence scores do not meet a confidence threshold value.

5. The method of claim 1, wherein the item information stored in the computer-readable memory comprises reference image information for the predefined item types, wherein selecting one of the set of possible items comprises:
   comparing the image information with the reference image information for two or more of the set of possible items;
   determining a respective identification score for each of the two or more possible items; and
   selecting, from the two or more possible items, the possible item corresponding to the largest identification score.

6. The method of claim 5, further comprising:
   determining, for each of the two or more possible items and based on the comparison of the image information with the reference image information, a respective item similarity score; and
   determining, for each of the two or more possible items and based on the one or more items associated with the personal profile information, a respective confidence score indicating a likelihood that the corresponding possible item was selected by the person;
   wherein the identification score is determined based on the confidence score and the item similarity score.

7. The method of claim 1, wherein the image information does not include encoded identification information that is sufficient to identify the item.

8. A computer program product for visual identification of an item selected by a person during a transaction, the transaction occurring within an environment having a plurality of items corresponding to a plurality of predefined item types, each item type of the predefined item types having a predefined association with respective item information stored in a computer-readable memory, the computer program product comprising:
   a non-transitory computer-readable storage medium having computer-readable program code embodied therewith, the computer-readable program code executable by one or more computer processors to perform an operation that includes:
      acquiring, using a visual sensor disposed within the environment and coupled with the one or more computer processors, image information that includes at least a portion of the selected item;
      analyzing, using image processing techniques performed by the one or more computer processors, the image information to determine a set of possible items of the plurality of items for classifying the selected item;
      accessing, using the one or more computer processors, personal profile information stored in the computer-readable memory and associated with the person, the personal profile information being associated with one or more items of the plurality of items;
      selecting, based on the personal profile information, one of the set of possible items to thereby identify the selected item as one item type of the plurality of predefined types; and
      updating, based on the item information associate with the one item type, one or both of the personal profile information and a virtual transaction record stored in the computer-readable memory, the virtual transaction record associated with the person during the transaction.

9. The computer program product of claim 8, wherein the one or more items associated with the personal profile information includes one or more of: an item indicated by historical item interaction information, an item indicated by personal preference information, and an item indicated by medical information.

10. The computer program product of claim 8, wherein analyzing the image information comprises:
    determining one or more physical attributes of the selected item based on the image information; and
    determining the set of possible items based on matching the determined one or more physical attributes with the item information stored in the computer-readable memory, and
    wherein the one or more items associated with the personal profile information are used to remove one or more possible items from the set of possible items from consideration for selection.

11. The computer program product of claim 10, the operation further including:
    determining, for each possible item of the set of possible items and based on the personal profile information, a respective confidence score indicating a likelihood that the corresponding possible item was selected by the person,
    wherein the one or more possible items are removed from consideration when the corresponding confidence scores do not meet a confidence threshold value.

12. The computer program product of claim 8, wherein the item information stored in the computer-readable memory comprises reference image information for the predefined item types, wherein selecting one of the set of possible items comprises:
    comparing the image information with the reference image information for two or more of the set of possible items;
    determining a respective identification score for each of the two or more possible items; and
    selecting, from the two or more possible items, the possible item corresponding to the largest identification score.

13. The computer program product of claim 12, the operation further including:
    determining, for each of the two or more possible items and based on the comparison of the image information with the reference image information, a respective item similarity score; and
    determining, for each of the two or more possible items and based on the one or more items associated with the personal profile information, a respective confidence score indicating a likelihood that the corresponding possible item was selected by the person;
wherein the identification score is determined based on the confidence score and the item similarity score.

14. The computer program product of claim 8, wherein the image information does not include encoded identification information that is sufficient to identify the item.

15. A system for visual identification of an item selected by a person during a transaction, the transaction occurring within an environment having a plurality of items corresponding to a plurality of predefined item types, each item type of the predefined item types having a predefined association with respective item information stored in a computer-readable memory, the system comprising:
one or more computer processors;
at least a first visual sensor disposed within the environment and communicatively coupled with the one or more computer processors; and
a memory containing program code which, when executed by the one or more computer processors, performs an operation that includes:
acquiring, using a visual sensor disposed within the environment, image information that includes at least a portion of the selected item;
analyzing, using image processing techniques performed by the one or more computer processors, the image information to determine a set of possible items of the plurality of items for classifying the selected item;
accessing, using the one or more computer processors, personal profile information stored in the computer-readable memory and associated with the person, the personal profile information being associated with one or more items of the plurality of items;
selecting, based on the personal profile information, one of the set of possible items to thereby identify the selected item as one item type of the plurality of predefined item types; and
updating, based on the item information associated with the one item type, one or both of the personal profile information and a virtual transaction record stored in the computer-readable memory, the virtual transaction record associated with the person during the transaction.

16. The system of claim 15, wherein the one or more items associated with the personal profile information includes one or more of: an item indicated by historical item interaction information, an item indicated by personal preference information, and an item indicated by medical information.

17. The system of claim 15, wherein analyzing the image information comprises:
determining one or more physical attributes of the selected item based on the image information; and
determining the set of possible items based on matching the determined one or more physical attributes with the item information stored in the computer-readable memory, and
wherein the one or more items associated with the personal profile information are used to remove one or more possible items from the set of possible items from consideration for selection.

18. The system of claim 17, the operation further including:
determining, for each possible item of the set of possible items and based on the personal profile information, a respective confidence score indicating a likelihood that the corresponding possible item was selected by the person,
wherein the one or more possible items are removed from consideration when the corresponding confidence scores do not meet a confidence threshold value.

19. The system of claim 15, wherein the item information stored in the computer-readable memory comprises reference image information for the predefined item types, wherein selecting one of the set of possible items comprises:
comparing the image information with the reference image information for two or more of the set of possible items;
determining a respective identification score for each of the two or more possible items; and
selecting, from the two or more possible items, the possible item corresponding to the largest identification score.

20. The system of claim 19, the operation further including:
determining, for each of the two or more possible items and based on the comparison of the image information with the reference image information, a respective item similarity score; and
determining, for each of the two or more possible items and based on the one or more items associated with the personal profile information, a respective confidence score indicating a likelihood that the corresponding possible item was selected by the person;
wherein the identification score is determined based on the confidence score and the item similarity score.

* * * * *